United States Patent
Kim et al.

(10) Patent No.: US 9,650,046 B2
(45) Date of Patent: May 16, 2017

(54) VEHICLE TRAVEL CONTROL DEVICE

(71) Applicants: Jonggap Kim, Hadano (JP); Masaki Mitsuyasu, Kawasaki (JP); Rentaro Kuroki, Susono (JP); Takuya Hirai, Susono (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Jonggap Kim, Hadano (JP); Masaki Mitsuyasu, Kawasaki (JP); Rentaro Kuroki, Susono (JP); Takuya Hirai, Susono (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 14/439,295

(22) PCT Filed: Oct. 31, 2012

(86) PCT No.: PCT/JP2012/078229
§ 371 (c)(1),
(2) Date: Apr. 29, 2015

(87) PCT Pub. No.: WO2014/068721
PCT Pub. Date: May 8, 2014

(65) Prior Publication Data
US 2015/0284004 A1  Oct. 8, 2015

(51) Int. Cl.
*B60W 30/18* (2012.01)
*B60W 30/20* (2006.01)
(Continued)

(52) U.S. Cl.
CPC .... *B60W 30/18072* (2013.01); *B60W 10/026* (2013.01); *B60W 10/06* (2013.01);
(Continued)

(58) Field of Classification Search
None
See application file for complete search history.

(56) References Cited

U.S. PATENT DOCUMENTS

| 2008/0287253 A1* | 11/2008 | Gibson | B60W 30/20 477/53 |
| 2008/0288146 A1* | 11/2008 | Beechie | B60W 10/023 701/58 |
| 2013/0296123 A1* | 11/2013 | Doering | B60W 10/02 477/5 |

FOREIGN PATENT DOCUMENTS

| JP | H05-79364 A | 3/1993 |
| JP | 2002-227885 A | 8/2002 |

* cited by examiner

*Primary Examiner* — Jacob S Scott
(74) *Attorney, Agent, or Firm* — Oliff PLC

(57) ABSTRACT

A running control device of a vehicle includes an engine, a clutch separating the engine and wheels, and a torque converter with a lockup clutch transmitting power of the engine toward the wheels, the running control device of a vehicle is configured to execute a neutral inertia running mode that is an inertia running mode performed while the engine and the wheels are separated and a cylinder resting inertia running mode performed by stopping operation in at least some of cylinders of the engine while the engine and the wheels are coupled, the lockup clutch has a weak engagement force while the neutral inertia running mode is (Continued)

performed as compared to while the cylinder resting inertia running mode is performed.

4 Claims, 4 Drawing Sheets

(51) Int. Cl.
*B60W 10/02* (2006.01)
*B60W 10/06* (2006.01)
*F16H 59/76* (2006.01)
*F16H 61/14* (2006.01)
*F16D 48/02* (2006.01)

(52) U.S. Cl.
CPC ............. *B60W 30/20* (2013.01); *F16D 48/02* (2013.01); *F16H 59/76* (2013.01); *F16H 61/14* (2013.01); *F16H 61/143* (2013.01); *B60W 2030/1809* (2013.01); *B60W 2030/18081* (2013.01); *B60W 2030/203* (2013.01); *B60Y 2300/18066* (2013.01); *B60Y 2300/18075* (2013.01); *B60Y 2300/18083* (2013.01); *F16H 2061/146* (2013.01); *Y10T 477/73* (2015.01)

FIG.2

| RUNNING MODE | ENGINE 14 | CLUTCH C1 | ENGINE BRAKE FORCE |
|---|---|---|---|
| NORMAL RUNNING | OPERATED | ENGAGED | — |
| ENGINE BRAKE RUNNING | DRIVEN ROTATION (WITH OR WITHOUT F/C) | ENGAGED | LARGE |
| NEUTRAL INERTIA RUNNING | F/C; ROTATION STOP OR IDLE ROTATION | RELEASED | SMALL |
| CYLINDER RESTING INERTIA RUNNING | F/C; DRIVEN ROTATION ; CYLINDER RESTING | ENGAGED | MEDIUM |

VEHICLE TRAVEL CONTROL DEVICE

TECHNICAL FIELD

The present invention relates to a running control device of a vehicle including a clutch separating an engine and wheels and a torque converter with a lockup clutch and particularly to a technique when a plurality of types of inertia running modes can be performed with different processes of canceling the inertia running mode.

BACKGROUND ART

To extend a running distance of an inertia running mode and improve fuel consumption in a vehicle including a clutch separating an engine and wheels, it is conceivable that the vehicle is allowed to perform an inertia running mode with an engine brake force reduced when a predetermined condition is satisfied during normal running mode performed by using the power of the engine while the engine and the wheels are coupled. For example, in Patent Document 1, a control device of a vehicle is proposed that releases a clutch during running of the vehicle to separate an engine and wheels for performing the inertia running mode (referred to as neutral inertia running mode). In Patent Document 2, a control device of a vehicle is proposed that rests some of cylinders of the engine during running of the vehicle to reduce a pumping loss for performing the inertia running mode (referred to as cylinder resting inertia running mode).

PRIOR ART DOCUMENT

Patent Documents

Patent Document 1: Japanese Laid-Open Patent Publication No. 2002-227885
Patent Document 2: Japanese Laid-Open Patent Publication No. 5-79364

SUMMARY OF THE INVENTION

Problem to be Solved by the Invention

Although a reduction in engine brake force is in common, the two types of the inertia running modes, i.e., the neutral inertia running mode and the cylinder resting inertia running mode, have significantly different embodiments with respect to whether a clutch is released or whether a cylinder is rested. This difference between embodiments leads to different procedures at the time of cancel of the inertia running mode (e.g., at the time of return from the inertia running mode to the normal running mode). For example, in the case of return from the neutral inertia running mode, the procedure includes engaging the clutch and then transmitting the power of the engine toward the wheels after determination of return. In the case of return from the cylinder resting inertia running mode, the procedure includes transmitting the power of the engine toward the wheels after determination of return. As described above, a step of engaging the clutch is included at the time of return from the neutral inertia running mode. A vehicle is well known that includes a torque converter with a lockup clutch transmitting the power of the engine toward the wheels. If the lockup clutch is released (i.e., in the case of lockup-off), the torque converter (T/C) has a large power loss (fluid loss) and tends to significantly deteriorate fuel consumption because of the characteristics thereof, while a torque amplification effect and a vibration attenuation effect from fluid transmission are acquired. On the other hand, if the lockup clutch is engaged (i.e., in the case of lockup-on), the power loss is reduced while the torque amplification effect and the vibration attenuation effect from fluid transmission cannot be acquired because of the characteristics. In other words, although the lockup-on is preferable in terms of fuel consumption, the lockup-off is preferable if the torque amplification effect and the vibration attenuation effect are to be acquired. Therefore, if the lockup clutch is uniformly controlled in the two different types of the inertia running modes, i.e., the neutral inertia running mode and the cylinder resting inertia running mode, without considering the difference between the procedures of return from the inertia running mode as described above, fuel consumption may deteriorate, or a desired drive force (having the same meaning as a drive torque) may become difficult to acquire or an engagement shock of the clutch may deteriorate at the time of return from the inertia running mode (i.e., at the time of reacceleration). The problem as described above is unknown and no proposal has hitherto been made on giving consideration to the difference between the respective procedures at the time of return from the different types of the inertia running modes so as to properly control the lockup clutch during the respective types of the inertia running modes. With regard to the control of the lockup clutch, the lockup clutch has an engagement force (having the same meaning as a torque capacity) generated depending on a supplied engagement pressure (lockup clutch pressure) and can also be slipped. If the engagement force of the lockup clutch is relatively weak and a slip amount is large, the characteristics becomes closer to lockup-off and, if the engagement force is relatively strong and a slip amount is small, the characteristics becomes closer to lockup-on.

The present invention was conceived in view of the situations and it is therefore an object of the present invention to provide a running control device of a vehicle capable of satisfying the improvement in fuel consumption as well as the suppression of the engagement shock of the clutch and the improvement in acceleration performance at the time of return from the inertia running mode at the same time in different types of the inertia running modes.

Means for Solving the Problem

To achieve the object, the first aspect of the invention provides (a) a running control device of a vehicle including an engine, a clutch separating the engine and wheels, and a torque converter with a lockup clutch transmitting power of the engine toward the wheels, the running control device of a vehicle being configured to execute a neutral inertia running mode that is an inertia running mode performed while the engine and the wheels are separated and a cylinder resting inertia running mode performed by stopping operation in at least some of cylinders of the engine while the engine and the wheels are coupled, (b) the lockup clutch having a weak engagement force while the neutral inertia running mode is performed as compared to while the cylinder resting inertia running mode is performed.

Effects of the Invention

As described above, since the weakening of the engagement force of the lockup clutch during the neutral inertia running mode facilitates the acquisition of the vibration attenuation effect from fluid transmission of the torque converter at the time of return from the neutral inertia running mode and, the suppression of the engagement shock of the clutch is facilitated at the time of return. While since the engagement of the clutch is necessary at the time of return, the neutral inertia running mode is inferior in responsiveness until the start of generation of the drive force as compared to the cylinder resting inertia running mode, since the weakening of the engagement force of the lockup clutch during the neutral inertia running mode facilitates the acquisition of the torque amplification effect of the torque converter at the time of return from the neutral inertia running mode, the recovery of a delay in response until the start of generation of the drive force is facilitated at the time of return. On the other hand, since the engagement force of the lockup clutch is strengthened during the cylinder resting inertia running mode, the reduction in the power loss of the torque converter is facilitated, and the improvement in the fuel consumption during the cylinder resting inertia running mode is facilitated. Additionally, since the engagement force of the lockup clutch is strengthened during the cylinder resting inertia running mode, the reduction in the power loss of the torque converter is facilitated at the time of return from the cylinder resting inertia running mode, and the improvement in the fuel consumption is facilitated at the time of return. Even when the acquisition of the torque amplification effect of the torque converter is made difficult at the time of return from the cylinder resting inertia running mode because of the strengthening of the engagement force of the lockup clutch during the cylinder resting inertia running mode, since the clutch is originally engaged during the cylinder resting inertia running mode, a prompt start of the generation of the drive force is facilitated at the time of return. Even when the acquisition of the vibration attenuation effect from fluid transmission of the torque converter is made difficult at the time of return from the cylinder resting inertia running mode because of the strengthening of the engagement force of the lockup clutch during the cylinder resting inertia running mode, since the clutch is originally engaged during the cylinder resting inertia running mode, an engagement shock of the clutch is not generated at the time of return. Therefore, the improvement in fuel consumption as well as the suppression of the engagement shock of the clutch and the improvement in acceleration performance at the time of return from the inertia running mode can be satisfied at the same time in different types of the inertia running modes, which are the neutral inertia running mode and the cylinder resting inertia running mode, by changing the control of the lockup clutch during the respective types of the inertia running modes based on a difference in the return procedures from the inertia running mode.

The second aspect of the invention provides the running control device of a vehicle recited in the first aspect of the invention, wherein the lockup clutch is released while the neutral inertia running mode is performed, and wherein the lockup clutch is engaged while the cylinder resting inertia running mode is performed. Consequently, since the lockup clutch is set to lockup-off during the neutral inertia running mode, the vibration attenuation effect and the torque amplification effect are acquired at the time of return, and the engagement shock of the clutch is suppressed while a delay in response until the start of generation of the drive force is recovered at the time of return. Since the clutch is released during the neutral inertia running mode, and setting to lockup-off has no adverse effect on the fuel consumption. On the other hand, since the lockup clutch is set to lockup-on during the cylinder resting inertia running mode, the power loss of the torque converter is reduced and the fuel consumption during the cylinder resting inertia running mode is improved. Additionally, since the lockup clutch is set to lockup-on during the cylinder resting inertia running mode, the power loss of the torque converter is reduced at the time of return and the fuel consumption is improved at the time of return. Even though the torque amplification effect and the vibration attenuation effect are not acquired at the time of return because of lockup-on during the cylinder resting inertia running mode, since the clutch is originally engaged during the cylinder resting inertia running mode, the generation of the drive force is promptly started without occurrence of the engagement shock of the clutch at the time of return.

The third aspect of the invention provides the running control device of a vehicle recited in the first or second aspect of the invention, wherein the cylinder resting inertia running mode is an inertia running mode performed by stopping fuel supply to the engine while the engine and the wheels are coupled and by stopping operation of at least one of pistons and intake/exhaust valves of at least a part of the cylinders of the engine. Consequently, the cylinder resting inertia running mode is properly performed.

The fourth aspect of the invention provides the running control device of a vehicle recited in any one of the first to third aspects of the invention, wherein the neutral inertia running mode is an inertia running mode performed with fuel supply to the engine stopped to stop rotation, or an inertia running mode performed with the engine supplied with fuel and operated, while the engine and the wheels are separated. Consequently, since the weakening of the engagement force of the lockup clutch during the neutral inertia running mode facilitates the suppression of the engagement shock of the clutch at the time of return and a delay in response until the start of generation of the drive force is easily recovered at the time of return regardless of the presence/absence of the fuel supply to the engine.

BRIEF DESCRIPTION OF THE DRAWINGS

FIG. 2 is a diagram for explaining four running modes performed in the vehicle of FIG. 1.

MODE FOR CARRYING OUT THE INVENTION

Figure 1:
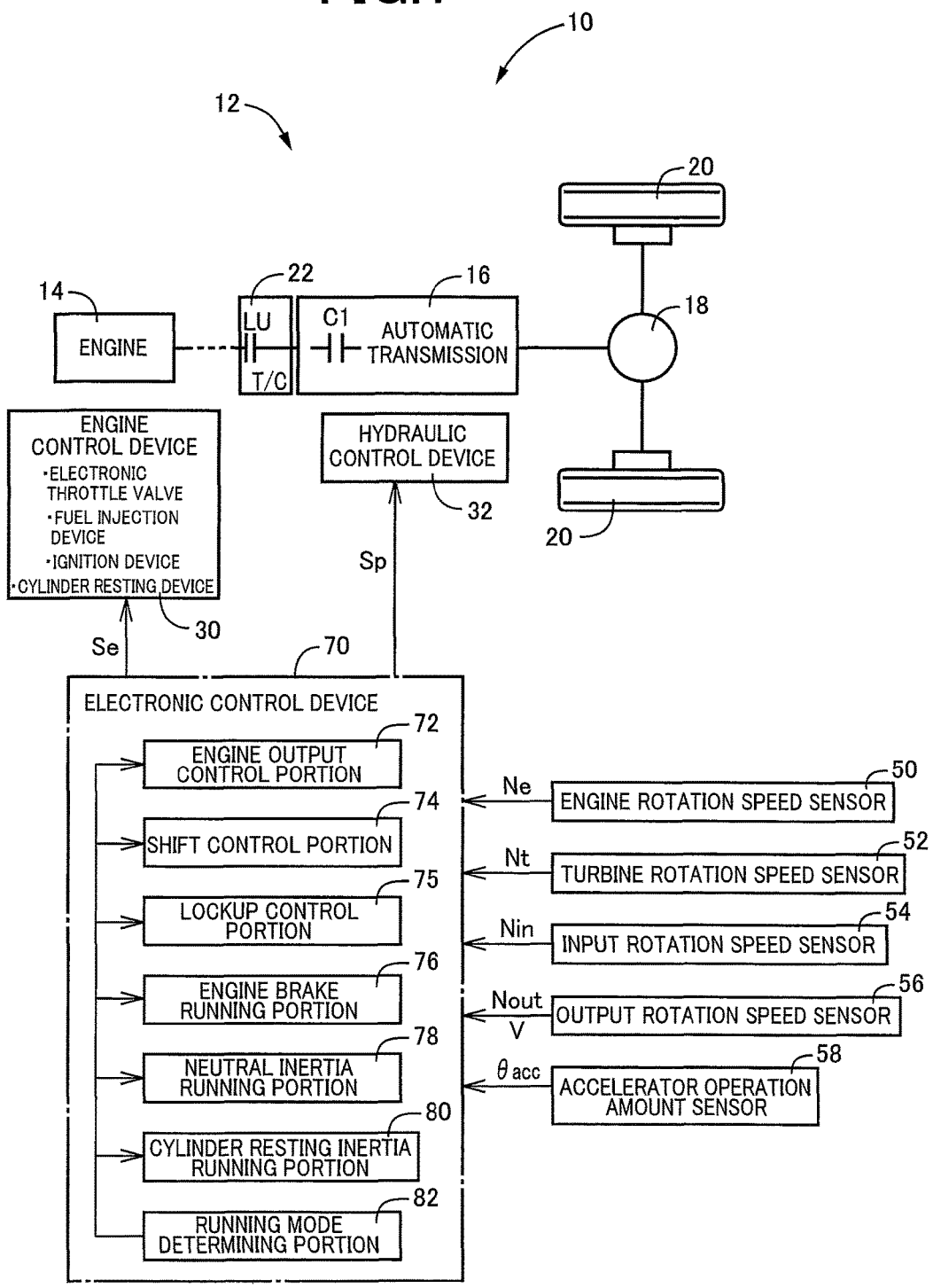
FIG. 1 is a diagram for explaining a general configuration of a drive device included in a vehicle to which the present invention is applied, and is a diagram for explaining a main portion of a control system in the vehicle.

In the present invention, preferably, the vehicle includes a transmission transmitting the power of the engine toward the wheels. The transmission is made up solely of an automatic transmission or of an automatic transmission having a fluid power transmission device. For example, this automatic transmission is made up of a known planetary gear automatic transmission, a synchronous meshing type parallel two-shaft automatic transmission that is a known synchronous meshing type parallel two-shaft transmission and that has gear stages automatically switched by a hydraulic actuator, a so-called DCT (Dual Clutch Transmission) that is a synchronous meshing type parallel two-shaft automatic transmission and that is of a type having two systems of input shafts, or a known belt type continuously variable transmission or a toroidal type continuously variable transmission, etc.

Preferably, the clutch may be any hydraulic engagement device capable of separating the engine and the wheels, including a brake in a broad sense. A vehicle including the transmission may use as the clutch a hydraulic friction engagement device making up a portion of the automatic transmission capable of being neutral.

Preferably, the engine is an internal combustion engine such as a gasoline engine and a diesel engine generating power from combustion of fuel, for example. Although the vehicle may include at least the engine as a drive force source, the vehicle may include another drive force source such as an electric motor in addition to the engine.

Preferably, the lockup clutch has an engagement force generated depending on a supplied lockup clutch pressure, for example, and is subjected to engagement/release control to be in any one of released (lockup-off), slipping, and engaged (lockup-on) states. A degree of the engagement force of the lockup clutch corresponds to the magnitude of the supplied lockup clutch pressure, for example, and corresponds to the magnitude of a command value to an electromagnetic valve device controlling the lockup clutch pressure.

Preferably, pistons and intake/exhaust valves can mechanically be stopped in the cylinder resting inertia running mode by disconnecting a clutch mechanism disposed between a crankshaft, the pistons and intake/exhaust valves, for example. With regard to the intake/exhaust valves, for example, if intake/exhaust valves of electromagnetic type etc. are used that can be controlled to open/close independently of the rotation of the crankshaft, the operation thereof may be stopped. Although appropriate stop positions of the intake/exhaust valves are positions where, for example, all the valves are in a closed valve state corresponding to that in compression strike, the stop positions are defined as needed, including stopping at positions where all the valves are in an opened valve state. If operation of some cylinders is stopped in the cylinder resting inertia running mode, the remaining cylinders have the pistons and the intake/exhaust valves operated in synchronization with the rotation of the crankshaft. For example, in the case of an eight-cylinder engine, only half of the cylinders, i.e., four cylinders, are rested while the remaining four cylinders are operated, or only six cylinders are rested while the remaining two cylinders are operated.

An example of the present invention will now be described in detail with reference to the drawings.

EXAMPLE

FIG. 1 is a diagram for explaining a general configuration of a drive device 12 included in a vehicle 10 to which the present invention is applied, and is a diagram for explaining a main portion of a control system for various controls in the vehicle 10. In FIG. 1, the drive device 12 includes an engine 14 and an automatic transmission 16, and the power of the engine 14 acting as a drive force source is transmitted from the automatic transmission 16 via a differential gear device 18 to left and right wheels 20. A torque converter 22 with a lockup clutch LU transmitting the power of the engine 14 toward the wheels 20 is disposed between the engine 14 and the automatic transmission 16. For example, a power transmission device such as a damper device is disposed between the engine 14 and the torque converter 22, and a motor generator acting as a drive force source can also be disposed therebetween.

The engine 14 includes an engine control device 30 having various pieces of equipment necessary for output control of the engine 14, such as an electronic throttle valve, a fuel injection device, and an ignition device, and a cylinder resting device. The electronic throttle valve, the fuel injection device, and the ignition device control an intake air amount, a fuel supply amount, and ignition timing, respectively, and are basically controlled depending on an operation amount of an accelerator pedal (an accelerator operation amount) θacc corresponding to a drive demand amount for the vehicle 10 from a driver. The fuel injection device can stop the fuel supply (perform a fuel cut F/C) at the time of accelerator-off when the accelerator operation amount θacc is determined as being zero even during running of the vehicle. The cylinder resting device can mechanically separate intake/exhaust valves of some or all of multiple cylinders, for example, eight cylinders, from a crankshaft by a clutch mechanism etc. to stop the valves and, for example, all the intake/exhaust valves are stopped at positions where the valves are in a closed valve state. As a result, since a pumping loss is reduced when the engine 14 is driven to rotate at the time of the fuel cut F/C, an engine brake force is reduced and a running distance of an inertia running mode can be extended. The cylinder resting device may rest the cylinders, for example, by employing a form in which all the intake/exhaust valves are stopped in the opened valve state or by employing a form in which pistons are separated from the crankshaft and stopped instead of or in addition to the form in which the intake/exhaust valves are stopped.

The torque converter 22 is a fluid power transmission device transmitting power input to an input-side rotating member (a pump impeller) through fluid to output the power from an output-side rotating member (a turbine impeller). The input-side rotating member of the torque converter 22 is coupled to the engine 14, and the output-side rotating member of the torque converter 22 is coupled to the automatic transmission 16. The lockup clutch LU included in the torque converter 22 is a direct clutch mechanically coupling the input-side rotating member and the output-side rotating member. A hydraulic control device 32 included in the vehicle 10 supplies lockup clutch pressure to the lockup clutch LU by using an oil pressure generated by an oil pump not depicted as an original pressure. The lockup clutch LU has an engagement force (having the same meaning as a lockup clutch torque) generated depending on the lockup clutch pressure and is subjected to the engagement/release control to be in any one state out of lockup-off, slipping, and lockup-on.

The automatic transmission 16 is a stepped automatic transmission of a planetary gear type etc., having a plurality of gear stages with different gear ratios established depending on engaged/released states of a plurality of hydraulic friction engagement devices (clutches and brakes). In the automatic transmission 16, each of the hydraulic friction engagement devices is subjected to engagement/release control by electromagnetic hydraulic control valves, switching valves, etc. disposed in a hydraulic control device 32 so that a predetermined gear stage is established depending on a driver's accelerator operation, a vehicle speed V, etc. A clutch C1 acts as an input clutch of the automatic transmission 16 and is a hydraulic friction engagement device subjected to the engagement/release control by the hydraulic control device 32 in the same way. The clutch C1 corresponds to a connecting/disconnecting device (clutch) connecting and disconnecting the engine 14 and the wheels 20. The automatic transmission 16 may be implemented by using a continuously variable transmission of a belt type etc., instead of a stepped transmission.

The vehicle 10 includes an electronic control device 70 including a running control device of the vehicle 10 related to the engagement/release control of the lockup clutch LU, for example. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 14, the shift control of the automatic transmission 16, the torque capacity control of the clutch C1 and the lockup clutch LU, etc., and is configured separately as needed for the engine control, the hydraulic control, etc. The electronic control device 70 is supplied with each of various signals (e.g., an engine rotation speed Ne that is a rotation speed of the engine 14, a turbine rotation speed Nt that is a rotation speed of a turbine shaft of the torque converter, a transmission input rotation speed Nin that is an input rotation speed of the automatic transmission 16, a transmission output rotation speed Nout that is an output rotation speed of the automatic transmission 16 corresponding to the vehicle speed V, and the accelerator operation amount θacc) based on detection values from various sensors (e.g., an engine rotation speed sensor 50, a turbine rotation speed sensor 52, an input rotation speed sensor 54, an output rotation speed sensor 56, and an accelerator operation amount sensor 58). The electronic control device 70 outputs, for example, an engine output control command signal Se for the output control of the engine 14, an oil pressure command signal Sp for the engagement control of the lockup clutch LU, the engagement control of the clutch C1 and the shift control of the automatic transmission 16 to the engine control device 30 and the hydraulic control device 32, respectively.

The electronic control device 70 functionally includes an engine output control means, i.e., an engine output control portion 72, a shift control means, i.e., a shift control portion 74, a lockup control means, i.e., a lockup control portion 75, an engine brake running means, i.e., an engine brake running portion 76, a neutral inertia running means, i.e., a neutral inertia running portion 78, a cylinder resting inertia running means, i.e., a cylinder resting inertia running portion 80, and a running mode determining means, i.e., a running mode determining portion 82.

The engine output control portion 72 outputs to the engine control device 30 the engine output control command signals Se controlling opening/closing of the electronic throttle valve, controlling a fuel injection amount from the fuel injection device, and controlling the ignition timing of the ignition device such that a requested engine torque Te (hereinafter, a demand engine torque Tedem) is acquired, for example. The engine output control portion 72 calculates a demand drive force Fdem as a drive demand amount based on the actual accelerator operation amount θacc and vehicle speed V from a relationship (a drive force map) not depicted stored in advance between the vehicle speed V and the demand drive force Fdem by using the accelerator operation amount θacc as a parameter, for example, and calculates a demand engine torque Tedem at which the demand drive force Fdem is acquired, based on the gear ratio e at the current gear stage of the automatic transmission 16 etc. The drive demand amount can be implemented by using not only the demand drive force Fdem [N] at the wheels 20 but also a demand drive torque Touttgt [Nm] at the wheels 20, a demand drive power [W] at the wheels 20, a demand transmission output torque of the automatic transmission 16, a demand transmission input torque of the automatic transmission 16, and the demand engine torque Tedem. The drive demand amount can also be implemented by simply using the accelerator operation amount θacc [%], a throttle valve opening degree [%], an intake air amount [g/sec] of the engine 14, etc.

The shift control portion 74 provides the shift control of the automatic transmission 16. Specifically, the shift control portion 74 makes a shift determination based on a vehicle state indicated by the actual vehicle speed V and the drive demand amount from a known relationship (a shift map, a shift diagram) defined in advance and stored by using the vehicle speed V and the drive demand amount as variables. If it is determined that a shift of the automatic transmission 16 should be performed, the shift control portion 74 outputs to the hydraulic control device 32 the oil pressure command signal Sp for engaging and/or releasing the hydraulic friction engagement devices involved with the shift of the automatic transmission 16 such that the determined gear stage is achieved.

The lockup control portion 75 provides an engagement control of the lockup clutch LU. Specifically, the lockup control portion 75 makes a switching determination of the operation state of the lockup clutch LU based on a vehicle state indicated by the actual vehicle speed V and the drive demand amount from a known relationship (a lockup map, a lockup switching diagram) defined in advance and stored by using the vehicle speed V and the drive demand amount as variables. If it is determined that the operation state of the lockup clutch LU should be switched, the shift control portion 74 outputs to the hydraulic control device 32 the oil pressure command signal Sp for releasing or engaging the lockup clutch LU such that the determined operation state is achieved.

The engine output control portion 72, the shift control portion 74, and the lockup control portion 75, the engine brake running portion 76, the neutral inertia running portion 78, and the cylinder resting inertia running portion 80 perform four respective running modes depicted in FIG. 2. The engine output control portion 72, the shift control portion 74, and the lockup control portion 75 perform a normal running mode performed by using the power of the engine 14 with the engine 14 and the wheels 20 coupled (i.e., with the clutch C1 engaged). Specifically, as described above, the engine output control portion 72 provides the output control of the engine 14 such that the drive demand amount is acquired and the shift control portion 74 provides the shift control of the automatic transmission 16 including engagement of the clutch C1 based on the vehicle state indicated by the actual vehicle speed V and the drive demand amount from the shift map while the lockup control portion 75 provides the engagement control of the lockup clutch LU based on the vehicle state indicated by the actual vehicle speed V and the drive demand amount from the lockup map.

The engine brake running portion 76 performs the engine brake running mode (also referred to as engine-braking) that is an inertia running mode performed with the engine 14 and the wheels 20 coupled without stopping the operation in the cylinders of the engine 14. This engine brake running mode is performed with the coupling state between the engine 14 and the wheels 20 maintained during accelerator-off, for example, and an engine brake is generated by a pumping loss, a friction torque, etc. from the driven rotation of the engine 14. Although the engine 14 may be supplied with a minimum amount of fuel as is the case with the idling state during accelerator-off, the engine 14 is controlled to be in a fuel cut state in which fuel supply to the engine 14 is stopped in this example. The automatic transmission 16 has a predetermined gear stage established depending on the vehicle speed V etc., and the clutch C1 is retained in the engaged state. As a result, the engine 14 is driven to rotate at a predetermined rotation speed defined depending on the vehicle speed V and the gear ratio e and the engine brake force of the magnitude corresponding to the rotation speed is generated.

The neutral inertia running portion 78 performs a neutral inertia running mode (also referred to as N-coasting) that is an inertia running mode performed with the engine 14 and the wheels 20 separated (i.e., with the clutch C1 released). In the neutral inertia running mode, the fuel supply to the engine 14 may be stopped to halt the rotation, or the engine 14 may be supplied with fuel and operated. Therefore, the engine 14 may be put into a state in which the rotation is stopped by performing a fuel cut F/C or may be put into an idling state for self-sustaining operation. Since the release of the clutch C1 results in the engine brake force of substantially zero in the neutral inertia running mode, a reduction in running resistance extends the running distance of the inertia running mode, and fuel consumption can be improved. Although fuel is consumed if the engine 14 is operated in the idling state, since the distance of the inertia running mode becomes longer as compared to the engine brake running mode, a frequency of reacceleration is reduced and overall fuel consumption is improved.

The cylinder resting inertia running portion 80 performs the cylinder resting inertia running mode (also referred to as cylinder resting coasting) that is an inertia running mode performed by stopping operation in at least some of the cylinders of the engine 14 while the engine 14 and the wheels 20 are coupled. In the cylinder resting inertia running mode, while the engaged state of the clutch C1 is maintained to couple the engine 14 and the wheels 20, the fuel supply to the engine 14 is stopped (the fuel cut F/C is performed), and the cylinder resting device of the engine control device 30 stops the operation of the intake/exhaust valves of at least some of the cylinders of the engine 14 at the positions where all the valves are in the closed valve state. In this case, since the intake/exhaust valves are stopped in the closed valve state although the crankshaft is driven to rotate depending on the vehicle speed V and the gear stage of the automatic transmission 16, a loss due to a pumping action becomes smaller as compared to the case of opening/closing in synchronization with the crankshaft, and the engine brake force is reduced as compared to the engine brake running mode. As a result, the running distance of the inertia running mode is extended and the fuel consumption is improved. Although the engine brake force is larger as compared to the neutral inertia running mode and the running distance of the inertia running mode becomes relatively short in the cylinder resting inertia running mode, the engine 14 is subjected to the fuel cut and simply driven to rotate and, therefore, the efficiency of fuel consumption is on the same level with, or equal to or greater than, the neutral inertia running mode when the engine 14 is operated in the idling state.

The running mode determining portion 82 determines any one mode for the running of the vehicle from the four running modes, i.e., the normal running mode, the engine brake running mode, the neutral inertia running mode, and the cylinder resting inertia running mode, and switches to the determined running mode or determines which mode the vehicle is actually running in. Specifically, for example, during accelerator-on when the accelerator operation amount θacc is not determined as zero, the running mode determining portion 82 basically determines to perform the normal running mode. On the other hand, for example, if the accelerator is continuously turned off for a predetermined time or longer during the normal running mode, the running mode determining portion 82 determines to perform the engine brake running mode, the neutral inertia running mode, or the cylinder resting inertia running mode based on predefined inertia running conditions. The inertia running conditions are defined in advance such that the engine brake running mode, the neutral inertia running mode, or the cylinder resting inertia running mode are performed by using classification according to the vehicle speed V, a brake operation force, a steering angle, a running road, and a situation of another vehicle, for example. For example, it is defined in advance that the neutral inertia running mode or the cylinder resting inertia running mode are performed in a region where the brake operation force is small and that the engine brake running mode are in a region where the brake operation force is large, respectively. The conditions are defined in advance such that the execution of the neutral inertia running mode is facilitated as compared to the cylinder resting inertia running mode when the running road is a flat road or a gentle downslope, when the vehicle is running straight, when a preceding vehicle is absent, or when an inter-vehicle distance to a preceding vehicle is equal to or greater than a predetermined inter-vehicle distance. Although the conditions may be defined in advance such that the fuel cut F/C having a high fuel consumption improvement effect is basically performed in the neutral inertia running mode, the conditions may be defined in advance such that the engine 14 is put into the idling state if the engine 14 must be warmed up, if a battery must be charged by the power of the engine 14, or if the mechanical oil pump must be driven by the power of the engine 14.

If a canceling condition for canceling the inertia running mode is satisfied during the engine brake running mode, the neutral inertia running mode, or the cylinder resting inertia running mode, the running mode determining portion 82 cancels the inertia running mode and determines to switch to another running. The canceling condition is a predetermined return condition for returning to the normal running mode, which is an increase in the drive demand amount (e.g., accelerator-on), for example. If the predetermined return condition is satisfied, the running mode determining portion 82 determines to return to the normal running mode. Alternatively, the canceling condition is a predetermined shift condition for shifting to the engine brake running mode such as a brake operation force equal to or greater than a predetermined brake operation force, a steering angle equal to or greater than a predetermined steering angle, or an inter-vehicle distance equal to or greater than a predetermined inter-vehicle distance during the neutral inertia running mode or during the cylinder resting inertia running mode. If the predetermined shift condition is satisfied, the running mode determining portion 82 determines to shift to the engine brake running mode.

The running mode determining portion 82 determines the running mode of the actual running being performed out of the normal running mode, the engine brake running mode, the neutral inertia running mode, and the cylinder resting inertia running mode, based on a state of the engine 14 and a state of the clutch C1 as depicted in FIG. 2, for example.

Alternatively, if a flag indicative of the running mode is defined in advance, the running mode determining portion 82 may determine the running mode of the actual running being performed based on the actual flag.

While a step of engaging the clutch C1 is included in the case of return from the neutral inertia running mode to the normal running mode, the step is not included in the case of return from the cylinder resting inertia running mode to the normal running mode since the clutch C1 is originally engaged. Therefore, since the engagement of the clutch C1 is necessary at the time of return, the neutral inertia running may generate an engagement shock of the clutch C1 or may be inferior in responsiveness until the start of generation of the drive force as compared to the cylinder resting inertia running. When the lockup clutch LU is lockup-off, the torque converter 22 has a large power loss and tends to deteriorate fuel consumption as compared to during lockup-on, while a torque amplification effect and a vibration attenuation effect are acquired unlike during lockup-on because of its characteristics. Therefore, if the lockup clutch LU is uniformly controlled during the neutral inertia running and the cylinder resting inertia running, fuel consumption may deteriorate, or a desired drive force may become difficult to acquire or the engagement shock of the clutch C1 may deteriorate at the time of return from the inertia running.

Therefore, the electronic control device 70 sets the operation state of the lockup clutch LU during the neutral inertia running and the cylinder resting inertia running in consideration of the characteristics of the respective types of the inertia running and the characteristics of the torque converter 22. Specifically, the lockup control portion 75 weakens the engagement force of the lockup clutch LU while the neutral inertia running is performed as compared to while the cylinder resting inertia running is performed. For example, during the neutral inertia running, the lockup control portion 75 outputs to the hydraulic control device 32 the oil pressure command signal Sp setting the lockup clutch LU to lockup-off. During the cylinder resting inertia running, the lockup control portion 75 outputs to the hydraulic control device 32 the oil pressure command signal Sp setting the lockup clutch LU to lockup-on.

Figure 3:
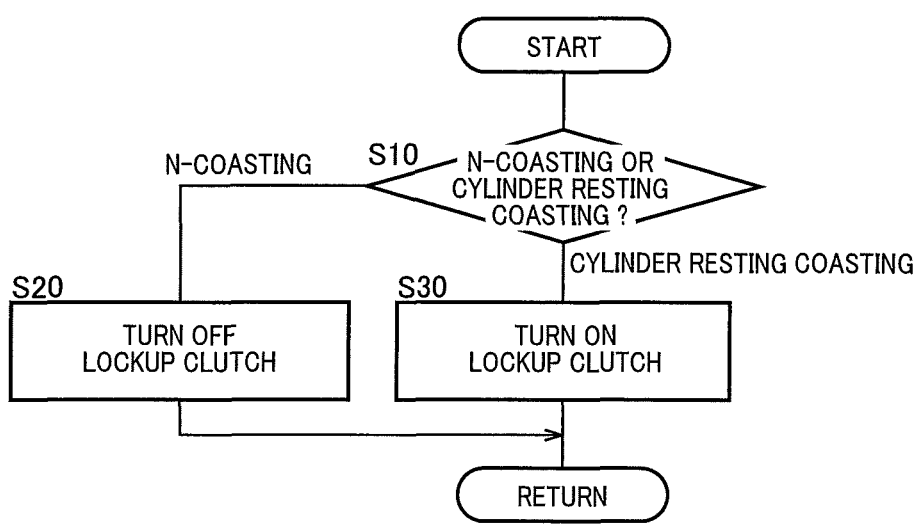
FIG. 3 is a flowchart for explaining a main portion of the control operation of the electronic control device, i.e., the control operation for satisfying the improvement in fuel consumption as well as the suppression of the engagement shock of the clutch and the improvement in acceleration performance at the time of return from the inertia running mode at the same time in different types of the inertia running.
Figure 4:
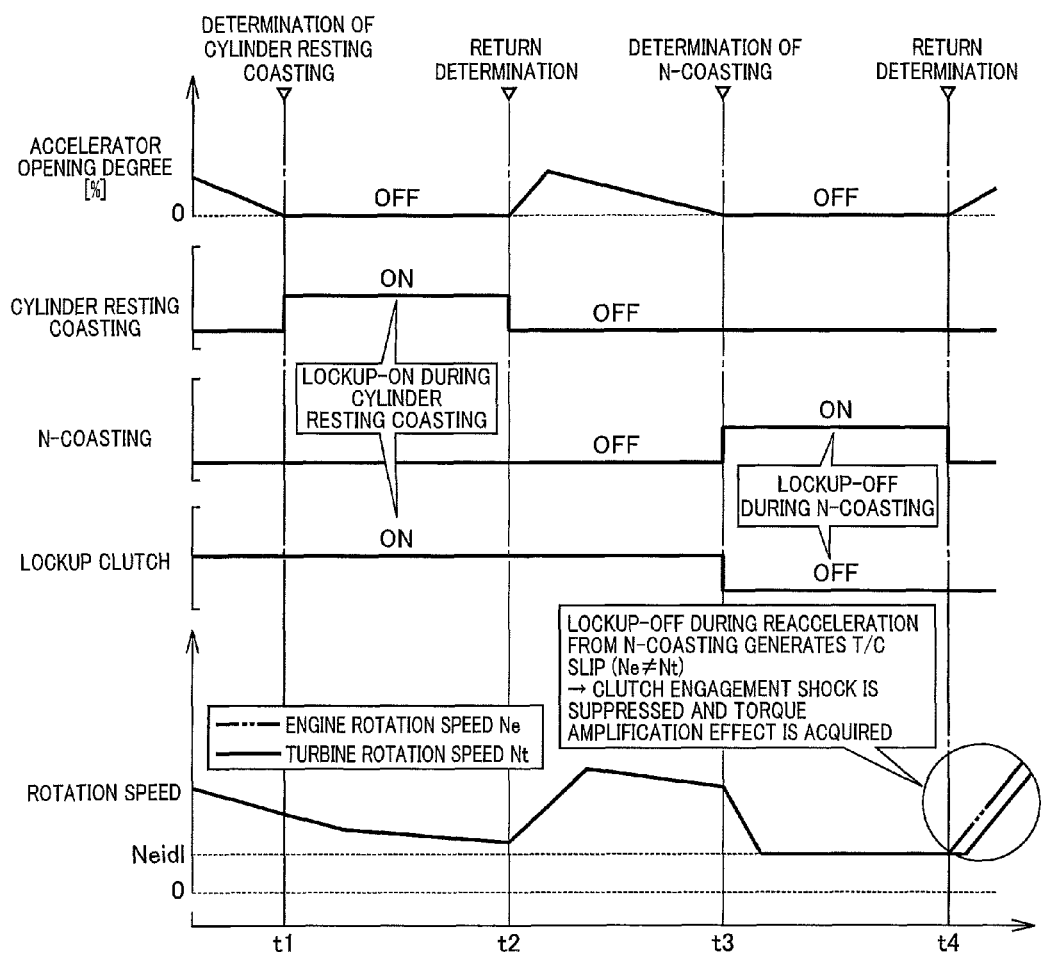
FIG. 4 is a time chart when the control operation depicted in the flowchart of FIG. 3 is executed.

FIG. 3 is a flowchart for explaining a main portion of the control operation of the electronic control device 70, i.e., the control operation for satisfying the improvement in fuel consumption as well as the suppression of the engagement shock of the clutch C1 and the improvement in acceleration performance at the time of return from the inertia running mode at the same time in different types of the inertia running modes, which are the neutral inertia running mode and the cylinder resting inertia running mode, and is repeatedly executed with an extremely short cycle time, for example, on the order of a few msec to a few tens of msec. The flowchart of FIG. 3 is based on the assumption that the inertia running mode is performed because the accelerator is turned off during the normal running mode. FIG. 4 is a time chart when the control operation depicted in the flowchart of FIG. 3 is executed.

In FIG. 3, first, at step (hereinafter, step will be omitted) S10 corresponding to the running mode determining portion 82, the running mode of actual inertia running mode being performed is determined out of the neutral inertia running mode and the cylinder resting inertia running mode, for example. If it is determined at S10 that the running mode is the neutral inertia running mode, for example, the lockup clutch LU is set to lockup-off at S20 corresponding to the lockup control portion 75 (time t3 to time t4 of FIG. 4). On the other hand, if it is determined at S10 that the running mode is the cylinder resting inertia running mode, for example, the lockup clutch LU is set to lockup-on at S30 corresponding to the lockup control portion 75 (time t1 to time t2 of FIG. 4).

In FIG. 4, if the cylinder resting inertia running mode is determined in association with accelerator-off during the normal running mode (time t1), the cylinder resting inertia running mode is performed. The lockup clutch LU is set to lockup-on during the cylinder resting inertia running (time t1 to time t2). Since the clutch C1 is engaged during the cylinder resting inertia running and the engagement control of the clutch C1 is not required at the time of return, it is not necessary to consider the engagement shock and a delay in start of generation of the drive force at the time of return. Therefore, during the cylinder resting inertia running, the power loss in the torque converter 22 is reduced to improve the fuel consumption by setting to lockup-on. If a return determination (time t2) is made in association with accelerator-on, a return to the normal running mode is performed. Since the lockup clutch LU is set to lockup-on at the time of return from the cylinder resting inertia running, the power loss in the torque converter 22 is reduced to improve the fuel consumption. Since the engagement control of the clutch C1 is not involved, the vibration attenuation effect is not necessary and the generation of the drive force is promptly started even without the torque amplification effect. If the neutral inertia running is determined in association with accelerator-off during the normal running mode (time t3), the neutral inertia running is performed. The lockup clutch LU is set to lockup-off during the neutral inertia running (time t3 to time t4). Although the clutch C1 is released during the neutral inertia running and a difference in the operation state does not affect the fuel consumption etc., regardless of the operation state to which the lockup clutch LU is set, the lockup clutch LU is set to lockup-off in consideration of the time of return. If a return determination (time t4) is made in association with accelerator-on, a return to the normal running mode is performed. Since the lockup clutch LU is set to lockup-off at the time of return from the neutral inertia running, a slip occurs in the torque converter 22 and the engagement shock is suppressed in the engagement control of the clutch C1. Additionally, with regard to a delay in start of generation of the drive force required for the engagement control of clutch C1 at the time of vehicle acceleration after the return, the acceleration responsiveness at the time of return can be recovered since the torque amplification effect can be acquired.

As described above, according to this example, since the lockup clutch LU is set to lockup-off during the neutral inertia running, the vibration attenuation effect from fluid transmission of the torque converter 22 and the torque amplification effect of the torque converter 22 are acquired at the time of return from the neutral inertia running, and the engagement shock of the clutch C1 is suppressed while a delay in response until the start of generation of the drive force is recovered at the time of return. Since the clutch C1 is released during the neutral inertia running, the fuel consumption is originally relatively improved, and setting to lockup-off has no adverse effect on the fuel consumption. On the other hand, since the lockup clutch LU is set to lockup-on during the cylinder resting inertia running, the power loss of the torque converter 22 is reduced and the fuel consumption during the cylinder resting inertia running is improved. Additionally, since the lockup clutch LU is set to lockup-on during the cylinder resting inertia running, the power loss of the torque converter 22 is reduced at the time of return from the cylinder resting inertia running and the fuel consumption is improved at the time of return. Even though the torque amplification effect and the vibration attenuation effect are not acquired at the time of return from the cylinder resting inertia running because of lockup-on during the cylinder resting inertia running, since the clutch is originally engaged during the cylinder resting inertia running, the generation of the drive force is promptly started without occurrence of the engagement shock of the clutch C1 at the time of return. Therefore, the improvement in fuel consumption as well as the suppression of the engagement shock of the clutch C1 and the improvement in acceleration performance at the time of return from the inertia running can be satisfied at the same time for different types of the inertia running, which are the neutral inertia running and the cylinder resting inertia running, by changing the control of the lockup clutch LU during the respective types of the inertia running based on a difference in the return procedures from the respective types of the inertia running.

According to this example, since the neutral inertia running is the inertia running with the rotation of engine 14 stopped by the fuel cut F/C, or the inertia running with the engine 14 operated in the idling state, while the engine 14 and the wheels 20 are separated, the engagement shock of the clutch C1 is suppressed and a delay in response until the start of generation of the drive force is recovered at the time of return by setting the lockup clutch LU to lockup-off during the neutral inertia running regardless of the presence/absence of the fuel supply to the engine 14.

Although the example of the present invention has been described in detail with reference to the drawings, the present invention is also applied in other forms.

For example, although the form of weakening the engagement force of the lockup clutch LU during the neutral inertia running as compared to the cylinder resting inertia running is exemplified as a form of setting to lockup-off during the neutral inertia running and setting to lockup-on during the cylinder resting inertia running in the example, this is not a limitation. For example, the form may be achieved as a form of setting to lockup-off during the neutral inertia running and setting to slipping during the cylinder resting inertia running, a form of setting to slipping during the neutral inertia running and setting to lockup-on during the cylinder resting inertia running, or a form of setting to slipping during the both types of the inertia running with a slip amount (=Ne−Nt) made larger during the neutral inertia running as compared to the cylinder resting inertia running. The following effect is also acquired in this way as is the case with the example.

Since the weakening of the engagement force of the lockup clutch LU during the neutral inertia running facilitates the acquisition of the vibration attenuation effect and the torque amplification effect at the time of return, the suppression of the engagement shock of the clutch C1 is facilitated while the recovery of a delay in response until the start of generation of the drive force is facilitated at the time of return. Since the clutch C1 is released during the neutral inertia running, the weakening of the engagement force of the lockup clutch LU has no adverse effect on the fuel consumption. On the other hand, since the engagement force of the lockup clutch LU is strengthened during the cylinder resting inertia running, the reduction in the power loss of the torque converter 22 is facilitated, and the improvement in the fuel consumption during the cylinder resting inertia running is facilitated. Additionally, since the engagement force of the lockup clutch LU is strengthened during the cylinder resting inertia running, the reduction in the power loss of the torque converter 22 is facilitated at the time of return, and the improvement in the fuel consumption is facilitated at the time of return. Even when the acquisition of the torque amplification effect and the vibration attenuation effect is made difficult at the time of return because of the strengthening of the engagement force of the lockup clutch during the cylinder resting inertia running, since the clutch C1 is originally engaged during the cylinder resting inertia running, a prompt start of the generation of the drive force is facilitated without occurrence of the engagement shock of the clutch C1 at the time of return. On the other hand, the suppression of the engagement shock of the clutch C1 is facilitated and the recovery of a delay in response until the start of generation of the drive force is facilitated at the time of return, regardless of the presence/absence of the fuel supply to the engine 14 during the neutral inertia running.

Although the clutch C1 making up a portion of the automatic transmission 16 is exemplified as the clutch separating the engine 14 and the wheels 20 in the examples, this is not a limitation. For example, the clutch C1 may be disposed independently of the automatic transmission 16. If the automatic transmission 16 is, for example, a belt type continuously variable transmission, the clutch C1 is disposed independently of the continuously variable transmission, and the clutch may be an engagement device included in a known forward/backward switching device included in the vehicle along with the belt type continuously variable transmission. The present invention is applicable to a vehicle without a transmission.

Although the torque converter 22 is disposed between the engine 14 and the clutch C1 in the example, this is not a limitation. For example, if the clutch C1 is disposed on the engine 14 side independently of the automatic transmission 16, the torque converter 22 may be disposed between the clutch C1 and the automatic transmission 16. In short, the torque converter 22 only needs to be disposed to transmit the power of the engine 14 toward the wheels 20. However, if a transmission is included in the vehicle, the torque converter 22 is disposed to transmit the power of the engine 14 toward the transmission.

The above description is merely an embodiment and the present invention can be implemented in variously modified and improved forms based on the knowledge of those skilled in the art.

NOMENCLATURE OF ELEMENTS

10: vehicle 14: engine 20: wheels 22: torque converter 70: electronic control device (running control device) C1: clutch LU: lockup clutch

The invention claimed is:

1. A running control device of a vehicle including an engine, a clutch separating the engine and wheels, and a torque converter with a lockup clutch transmitting power of the engine toward the wheels, the running control device of a vehicle being configured to execute a neutral inertia running mode that is an inertia running mode performed while the engine and the wheels are separated and a cylinder resting inertia running mode performed by stopping operation in at least some of cylinders of the engine while the engine and the wheels are coupled, the lockup clutch having a weaker engagement force while the neutral inertia running mode is performed as compared to while the cylinder resting inertia running mode is performed.

2. The running control device of a vehicle of claim 1, wherein the lockup clutch is released while the neutral inertia running is performed, and wherein the lockup clutch is engaged while the cylinder resting inertia running is performed.

3. The running control device of a vehicle of claim 1, wherein the cylinder resting inertia running is inertia running performed by stopping fuel supply to the engine while the engine and the wheels are coupled and by stopping operation of at least one of pistons and intake/exhaust valves of at least some of the cylinders of the engine.

4. The running control device of a vehicle of claim 1, wherein the neutral inertia running is inertia running performed with fuel supply to the engine stopped to stop rotation, or inertia running performed with the engine supplied with fuel and operated, while the engine and the wheels are separated.

* * * * *